(12) United States Patent
Peuhkurinen

(10) Patent No.: US 10,979,681 B2
(45) Date of Patent: Apr. 13, 2021

(54) DISPLAY APPARATUS AND METHOD OF DISPLAYING USING LIGHT SOURCE AND BEAM SCANNING ARRANGEMENT

(71) Applicant: Varjo Technologies Oy, Helsinki (FI)

(72) Inventor: Ari Antti Erik Peuhkurinen, Helsinki (FI)

(73) Assignee: Varjo Technologies Oy, Helsinki (FI)

(*) Notice: Subject to any disclaimer, the term of this patent is extended or adjusted under 35 U.S.C. 154(b) by 184 days.

(21) Appl. No.: 16/130,445

(22) Filed: Sep. 13, 2018

(65) Prior Publication Data
US 2020/0092523 A1 Mar. 19, 2020

(51) Int. Cl.
G02B 26/10 (2006.01)
H04N 9/31 (2006.01)
G02B 27/00 (2006.01)
G02F 1/1343 (2006.01)
G02F 1/29 (2006.01)

(52) U.S. Cl.
CPC ....... *H04N 9/3164* (2013.01); *G02B 27/0093* (2013.01); *G02F 1/134309* (2013.01); *G02F 1/29* (2013.01); *H04N 9/3105* (2013.01); *H04N 9/3132* (2013.01); *H04N 9/3161* (2013.01)

(58) Field of Classification Search
CPC .............. G02B 26/101; G02B 27/0093; G02B 27/0172; G02B 2027/0147; G02B 27/00; G02B 26/10; G02F 1/134309; G02F 1/29; G02F 1/1343; H04N 9/3105; H04N 9/3132; H04N 9/3161; H04N 9/3164; H04N 9/31
See application file for complete search history.

(56) References Cited

U.S. PATENT DOCUMENTS

| | | | | |
|---|---|---|---|---|
| 6,147,822 A * | 11/2000 | Yamada | ............... | G02B 26/101 348/E5.145 |
| 6,227,667 B1 * | 5/2001 | Halldorsson | ......... | G02B 27/017 351/206 |
| 6,400,152 B1 * | 6/2002 | Cline | ................... | G01R 33/446 324/309 |
| 2002/0036750 A1 * | 3/2002 | Eberl | ....................... | A61B 3/12 351/207 |
| 2004/0217270 A1 * | 11/2004 | Publicover | ............ | G01Q 10/06 250/234 |
| 2012/0105310 A1 * | 5/2012 | Sverdrup | ........... | G02B 27/0172 345/8 |
| 2014/0253993 A1 * | 9/2014 | Lapstun | ................... | G02F 1/11 359/199.3 |

(Continued)

*Primary Examiner* — Balram T Parbadia
(74) *Attorney, Agent, or Firm* — Ziegler IP Law Group, LLC

(57) ABSTRACT

A display apparatus includes at least one light source per eye, the at least one light source being operable to emit a light beam; at least one beam scanning arrangement per eye, the at least one beam scanning arrangement being configured to direct the light beam towards a projection surface, and to sweep the light beam according to a scanning pattern, the scanning pattern being substantially in a form of a spiral; and a processor configured to control the at least one light source and the at least one beam scanning arrangement to draw at least a first region of an input image over the projection surface, wherein a resolution of the first region of the input image is to vary as a function of an angular distance from a centre of the spiral.

21 Claims, 6 Drawing Sheets

(56) References Cited

U.S. PATENT DOCUMENTS

| | | | |
|---|---|---|---|
| 2016/0085072 A1* | 3/2016 | Haddick | G09G 3/3225 |
| | | | 345/8 |
| 2016/0270656 A1* | 9/2016 | Samec | G02B 27/0093 |
| 2016/0328884 A1* | 11/2016 | Schowengerdt | G02B 27/017 |
| 2017/0276948 A1* | 9/2017 | Welch | G02B 27/0172 |
| 2017/0277256 A1* | 9/2017 | Burns | G06F 3/013 |
| 2017/0293145 A1* | 10/2017 | Miller | G02B 27/0093 |
| 2018/0205854 A1* | 7/2018 | Onoe | H04N 3/02 |

* cited by examiner

DISPLAY APPARATUS AND METHOD OF DISPLAYING USING LIGHT SOURCE AND BEAM SCANNING ARRANGEMENT

TECHNICAL FIELD

The present disclosure relates generally to display apparatuses; and more specifically, to display apparatuses comprising light sources, beam scanning arrangements, and processors. Furthermore, the present disclosure also relates to methods of displaying, via the aforementioned display apparatuses.

BACKGROUND

Nowadays, several technologies are being used to present interactive simulated environments to users of specialized devices. Such technologies include virtual reality, augmented reality, mixed reality, and the like. Presently, the users utilize the specialized devices (for example, such as virtual reality headsets, a pair of virtual reality glasses, augmented reality headsets, a pair of augmented reality glasses, mixed reality headsets, a pair of mixed reality glasses, and the like) for experiencing and interacting with such simulated environments. Specifically, the simulated environments enhance the user's experience of reality around him/her by providing the user with a feeling of immersion within the simulated environment, using contemporary techniques such as stereoscopy.

Generally, the specialized devices include displays or screens arranged therein, whereupon images constituting the simulated environments are rendered. Often, such devices have dedicated displays for each eye of the user, for providing different views of a given scene within the simulated environment to the user's eyes. Such different views allow the user to perceive stereoscopic depth within the given scene, thereby, creating the feeling of immersion within the simulated environment. Nowadays, some specialized devices also allow for implementing gaze-contingency therein, thereby, adjusting (namely, controlling) the simulated environment based upon a direction of the user's gaze.

However, conventional specialized devices have certain limitations associated therewith. In some existing specialized devices, there is lack of or suboptimal provision for determining the direction of the user's gaze. As a result, such specialized devices are limited in their ability to provide foveated rendering of interactive simulated environments. In other existing specialized devices, immersive and seamless active foveation is extremely hard to implement since such devices include a large number of optical components (such as lenses, mirrors, projectors, and the like) that are movable to implement gaze contingency. Often, an arrangement of such optical components within the specialized devices is complex and requires substantial time for adjustment of multiple optical components. As a result, such specialized devices suffer from issues such as substantial processing lag, suboptimal immersiveness, bulky device design, and the like Therefore, in light of the foregoing discussion, there exists a need to overcome the aforementioned drawbacks associated with conventional specialized devices for providing simulated environments.

SUMMARY

The present disclosure seeks to provide a display apparatus.

The present disclosure also seeks to provide a method of displaying, via a display apparatus.

The present disclosure seeks to provide a solution to the existing problems associated with implementation of foveation within specialized devices. An aim of the present disclosure is to provide a solution that overcomes at least partially the problems encountered in prior art, and provides an efficient display apparatus that provides foveated rendering whilst presenting simulated environments to users.

In one aspect, an embodiment of the present disclosure provides a display apparatus comprising:
- at least one light source per eye, the at least one light source being operable to emit a light beam;
- at least one beam scanning arrangement per eye, the at least one beam scanning arrangement being configured to direct the light beam towards a projection surface, and to sweep the light beam according to a scanning pattern, the scanning pattern being substantially in a form of a spiral; and
- a processor configured to control the at least one light source and the at least one beam scanning arrangement to draw at least a first region of an input image over the projection surface, wherein a resolution of the first region of the input image is to vary as a function of an angular distance from a centre of the spiral.

In another aspect, an embodiment of the present disclosure provides a method of displaying, via a display apparatus comprising at least one light source per eye and at least one beam scanning arrangement per eye, the method comprising:
- emitting a light beam, via the at least one light source;
- directing the light beam towards a projection surface and sweeping the light beam according to a scanning pattern, via the at least one beam scanning arrangement, the scanning pattern being substantially in a form of a spiral; and
- controlling the at least one light source and the at least one beam scanning arrangement to draw at least a first region of an input image over the projection surface, wherein a resolution of the first region of the input image varies as a function of an angular distance from a centre of the spiral.

Embodiments of the present disclosure substantially eliminate or at least partially address the aforementioned problems in the prior art, and enables substantially accurate and near-human eye implementation of foveation within the aforesaid display apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
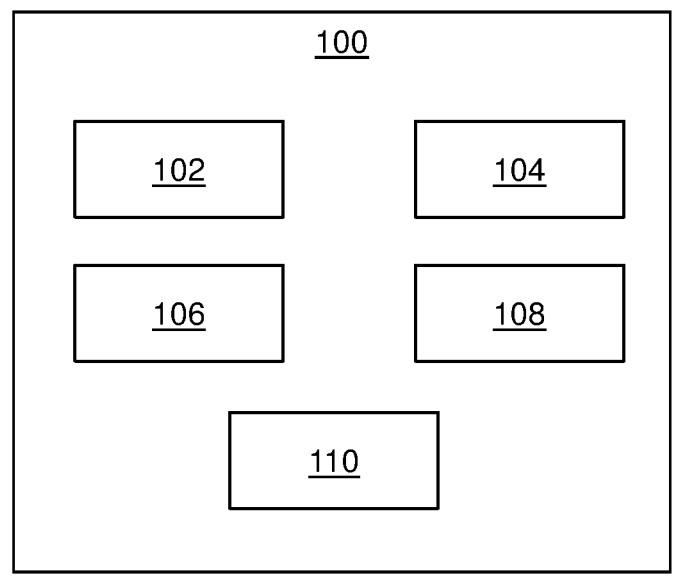
FIG. 1 illustrates a block diagram of architecture of a display apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display apparatus comprising:
- at least one light source per eye, the at least one light source being operable to emit a light beam;
- at least one beam scanning arrangement per eye, the at least one beam scanning arrangement being configured to direct the light beam towards a projection surface, and to sweep the light beam according to a scanning pattern, the scanning pattern being substantially in a form of a spiral; and
- a processor configured to control the at least one light source and the at least one beam scanning arrangement to draw at least a first region of an input image over the projection surface, wherein a resolution of the first region of the input image is to vary as a function of an angular distance from a centre of the spiral.

In another aspect, an embodiment of the present disclosure provides a method of displaying, via a display apparatus comprising at least one light source per eye and at least one beam scanning arrangement per eye, the method comprising:
- emitting a light beam, via the at least one light source;
- directing the light beam towards a projection surface and sweeping the light beam according to a scanning pattern, via the at least one beam scanning arrangement, the scanning pattern being substantially in a form of a spiral; and
- controlling the at least one light source and the at least one beam scanning arrangement to draw at least a first region of an input image over the projection surface, wherein a resolution of the first region of the input image varies as a function of an angular distance from a centre of the spiral.

The present disclosure provides the aforementioned display apparatus and the aforementioned method of displaying, via such a display apparatus. The display apparatus described herein is not limited in operation by number of components and arrangement of such components within the display apparatus. Notably, the described display apparatus allows for mimicking optical properties of human visual system. In other words, the display apparatus provides foveated rendering of interactive simulated environments, in an efficient manner. For example, in the display apparatus, optical properties and/or optical path of the light beam are adjusted by way of sophisticated equipment for accurately emulating foveation characteristics of the human visual system. Notably, the display apparatus has minimal or nil processing lag, and provides rich immersiveness within the simulated environments.

Throughout the present disclosure, the term "display apparatus" refers to specialized equipment that is configured to display a visual scene of a simulated environment to a user of the display apparatus when the display apparatus is worn by the user on his/her head. Examples of the simulated environment can include a fully virtual environment (namely, a virtual reality environment) as well as a real world environment including simulated objects therein (namely, an augmented reality environment, a mixed reality environment, and the like). Therefore, the display apparatus is operable to act as a device (for example, such as a virtual reality headset, an augmented reality headset, a mixed reality headset, a pair of virtual reality glasses, a pair of augmented reality glasses, a pair of mixed reality glasses and so forth) for presenting the simulated environment to the user.

Throughout the present disclosure, the term "visual scene" refers to a sequence of images that are to be presented to the user, via the display apparatus. In an example, the visual scene may be a virtual reality movie. In another example, the visual scene may be an educational augmented reality video. In yet another example, the visual scene may be a mixed reality game. It will be appreciated that the aforesaid display apparatus, and the aforesaid method are not limited to drawing at least the first region of only a single input image, and can be used to draw at least the first region of a plurality of input images (namely, the sequence of images of the visual scene).

Throughout the present disclosure, the term "light source" refers to an equipment configured to emit the light beam. Optionally, the light beam is a substantially collimated and monochromatic light beam. Optionally, in such a case, the at least one light source comprises at least one collimating element (for example, such as a collimating lens) to adjust a cross section of the light beam. Furthermore, optionally, the at least one light source comprises an optical filter configured to allow only light of a given wavelength or a given wavelength range to pass therethrough to be consequently emitted from the at least one light source. Examples of the at least one light source include, but are not limited to, a laser diode, a solid state laser, a light emitting diode, a cathode ray tube.

Notably, the display apparatus comprises at least two light sources, at least one of the at least two light sources being arranged to be used for a left eye of the user, and at least one of the at least two light sources being arranged to be used for a right eye of the user. Therefore, separate light sources for the left eye and the right eye of the user emit separate light beams. Each light beam has a corresponding optical path. As an example, the display apparatus may comprise one light source per eye, wherein the two light sources emit two substantially collimated and monochromatic light beams having two different optical paths.

Throughout the present disclosure, the term "beam scanning arrangement" refers to an equipment that can be controlled to direct the light beam towards the projection surface, and to move the light beam over the projection surface for optically scanning at least the first region of the input image over the projection surface. Such a movement of the light beam over the projection surface can be understood to be a smooth, sweep-like movement of the light beam that performs the aforesaid optical scanning operation. The at least one beam scanning arrangement is adjustable (for example, via tilting, rotation, shifting (namely, translation), and so forth) in one dimension or in two dimensions to move the light beam over the projection surface.

Notably, the display apparatus comprises at least two beam scanning arrangements, at least one of the at least two beam scanning arrangements being arranged to be used for the left eye of the user, and at least one of the at least two beam scanning arrangements being arranged to be used for the right eye of the user. Therefore, separate beam scanning arrangements for the left eye and the right eye of the user move separate light beams for the left eye and the right eye of the user, respectively, over the projection surface.

The at least one beam scanning arrangement is configured to sweep the light beam according to the scanning pattern, the scanning pattern being substantially in the form of the spiral. Throughout the present disclosure, the term "scanning pattern" refers to a form (namely, a shape) in which the light beam scans the projection surface to draw at least the first region of the input image over the projection surface. In order to sweep the light beam according to the scanning pattern, the at least one beam scanning arrangement is physically adjusted according to the scanning pattern. Given a specific arrangement of the at least one beam scanning arrangement within the display apparatus at a given time 't', the light beam can be understood to be incident upon a coordinate point b(t) of the projection surface, wherein b(t) is a two-dimensional coordinate point of the form (x,y). Notably, in a single sweep of the scanning pattern, a resultant trajectory of all b(t) coordinate points swept by the light beam has the form of the spiral. The coordinate point b(t) can be understood to correspond to a single pixel of a given region of the input image. It will be appreciated that the "spiral" is a curve that emanates from a point and extends around the point in a substantially-circular manner.

According to an embodiment, the scanning pattern is to be swept outwards from a centre of the spiral. In other words, a given sweep of the scanning pattern begins at the centre of the spiral and extends outwards from such a centre, towards an end point of the spiral.

According to another embodiment, the scanning pattern is to be swept inwards towards the centre of the spiral. In other words, a given sweep of the scanning pattern begins at an end point of the spiral and extends inwards from such an end point, towards the centre of the spiral.

According to yet another embodiment, the scanning pattern is to be swept outwards from the centre of the spiral and then inwards towards the centre in an alternating manner. In other words, a first sweep of the scanning pattern begins at the centre of the spiral and extends outwards from such a centre, towards an end point of the spiral, and a second sweep of the scanning pattern begins at the end point of the spiral and extends inwards from such an end point, towards the centre of the spiral.

It will be appreciated that the aforesaid manners of sweeping the scanning pattern in form of the spiral are exemplary only, and there may exist other manners of sweeping such a scanning pattern. Furthermore, it will be appreciated that any given manner of sweeping the scanning pattern can be employed repeatedly, for drawing a given region of the input image over the projection surface.

Optionally, the spiral is a logarithmic spiral. In the logarithmic spiral, a distance between successive turnings varies as a geometric progression. Furthermore, a shape of the logarithmic spiral remains substantially-unchanged with each successive turning owing to the logarithmic spiral's property of self-similarity. Therefore, it will be appreciated that the logarithmic spiral is well-suited to be employed as the scanning pattern, since the adjustment of the at least one beam scanning arrangement for sweeping the light beam according to such a scanning pattern would be based upon gradually changing functions. As a result, the at least one beam scanning arrangement is adjusted in a gradual manner for sweeping the light beam according to the scanning pattern. It will be appreciated that the logarithmic spiral is commonly referred to as "equiangular spiral", "growth spiral", "spira mirabilis", and the like. Such a logarithmic spiral is well-known in the art.

Alternatively, optionally, the spiral comprises a plurality of concentric circles, wherein the light beam is to be swept along a circumference of a given circle before moving onto another circle adjacent to the given circle. In such a case, a common centre of the plurality of concentric circles corresponds to the centre of the spiral. In an embodiment, a distance between the plurality of concentric circles is equal. In another embodiment, a distance between the plurality of concentric circles is unequal. When the scanning pattern is substantially in form of such a spiral comprising the plurality of concentric circles, the adjustment of the at least one beam scanning arrangement is optionally based upon a combination of gradually changing and abruptly changing functions. For example, the at least one beam scanning arrangement may be adjusted according to a gradually changing function whilst the light beam sweeps an entire circumference of any given circle and may be adjusted according to an abruptly changing function whilst the light beam moves from one circle to another.

Yet alternatively, optionally, the spiral is an Archimedean spiral. As an example, the spiral may be a Fermat's spiral. Such Archimedean spirals are well-known in the art.

Optionally, the at least one beam scanning arrangement is implemented by way of at least one of:
- a controllable scanning mirror arranged to reflect the light beam towards the projection surface,
- at least one actuator that, in operation, changes an orientation of the at least one light source to direct the light beam towards the projection surface.

Throughout the present disclosure, the term "controllable scanning mirror" refers to a solid-state mirror that is controllable to reflect (namely, deflect) the light beam incident thereupon towards the projection surface, for sweeping the light beam according to the scanning pattern. Notably, the processor is configured to control orientation and/or movement of the controllable scanning mirror according to the scanning pattern which the light beam is to sweep across the projection surface. Specifically, the controllable scanning mirror is controlled to sweep the light beam in the form of the spiral. Examples of the controllable scanning mirror include, but are not limited to, a micro-electro-mechanical systems (MEMS) mirror and a micro-opto-electro-mechanical systems (MOEMS) mirror.

Optionally, the controllable scanning mirror is mounted onto at least one base, the at least one base being associated with an actuation arrangement, wherein the actuation arrangement, in operation, controls a tilt of the controllable scanning mirror according to the scanning pattern. The term "base" refers to a structure (for example, such as a mirror mount including plates, adjustment screws, and so forth) whereupon the controllable scanning mirror is mounted. Optionally, the at least one base is arranged upon a foundation in a stack-like manner. Furthermore, optionally, the at least one base is coupled to the foundation via the actuation arrangement, wherein the foundation is configured to provide support to the aforesaid arrangement of the at least one base and the controllable scanning mirror, and wherein the actuation arrangement comprises at least one actuator. As an example, the foundation may be implemented as a micro-electro-mechanical systems chip base (namely, chip substrate) that is soldered to a printed circuit board. It will be appreciated that the actuation arrangement is an electric current-based actuation arrangement, a hydraulic pressure-based actuation arrangement, a pneumatic pressure-based actuation arrangement, and the like. Such actuation arrangements are well known in the art.

Throughout the present disclosure, the term "actuator" refers to an equipment that is operable to change the orientation of the at least one light source by way of an actuation signal, for sweeping the light beam according to the scanning pattern. Optionally, the at least one actuator physically adjusts the orientation of at least one light source by way of rotation and/or tilting. Furthermore, optionally, the at least one actuator changes a position of the at least one light source within the display apparatus. In such a case, the at least one actuator can shift the at least one light source horizontally and/or vertically. It will be appreciated that the actuation signal could be an electric current, hydraulic pressure, pneumatic pressure, and the like.

Throughout the present disclosure, the term "projection surface" refers to a surface that allows for drawing at least the first region of the input image thereupon. Notably, the projection surface has transmittance and reflectance specifications that are suitable for allowing the light beam to draw at least the first region thereupon. It will be appreciated that the first region could be drawn over the projection surface from either or both of: a front side of the projection surface, a back side of the projection surface.

Optionally, the display apparatus includes a projection surface per eye of the user. In such a case, separate first regions for the left eye and the right eye of the user are drawn over the separate projection surfaces. The separate first regions for the left eye and the right eye of the user collectively constitute the first region of the input image. Alternatively, optionally, a single projection surface is used for both eyes of the user on a shared basis. In such a case, the single projection surface is used to draw the separate first regions for both the left eye and the right eye of the user on a shared basis.

Optionally, the projection surface is a retina of the user's eyes. In such a case, the separate first regions are drawn over the retinas of both the left eye and the right eye of the user.

Throughout the present disclosure, the term "input image" refers to an image that represents (namely, depicts) a part of the visual scene that is to be displayed via the display apparatus. Notably, the input image can be understood to be a frame of the visual scene, wherein the sequence of images constituting the visual scene form a sequence of frames of the visual scene.

Optionally, the processor obtains the input image from any one of: an imaging device mounted on the display apparatus, a memory unit coupled in communication with the processor, a host device that is coupled in communication with the processor via a network, an image generation module of the processor.

In an embodiment, the input image is obtained from the imaging device mounted on the display apparatus. In such a case, the imaging device (for example, such as a pass-through digital camera) is configured to capture an image of a real-world environment as the input image.

In another embodiment, the input image is obtained from the memory unit. Optionally, the memory unit is implemented by way of hardware, software, firmware or a combination of these, suitable for storing the input image. At the memory unit, the input image is stored in a suitable format, for example, such as Motion Picture Experts Group (MPEG), Joint Photographic Experts Group (JPEG), and the like.

In yet another embodiment, the input image is obtained from the host device. The host device could be a host computer, a database server, a drone, a robot, and the like. Examples of the network between the host device and the processor include, but are not limited to, Internet, radio network, Personal Area Network, Local Area Network, Metropolitan Area Network and Wide Area Network.

In still another embodiment, the input image is obtained from the image generation module of the processor. In such a case, the input image is a computer generated image. Notably, the image generation module is implemented by way of hardware, software, firmware or a combination of these, suitable for generating the input image.

Throughout the present disclosure, the term "processor" refers to hardware, software, firmware or a combination of these, suitable for controlling the operation of the display apparatus. Notably, the processor is configured to control the operation of the display apparatus to display the visual scene to the user when the user uses the display apparatus (for example, by wearing the display apparatus on his/her head).

The processor is configured to control the at least one light source and the at least one beam scanning arrangement to draw at least the first region of the input image over the projection surface. Notably, the processor is coupled to the at least one light source and the at least one beam scanning arrangement. The "first region" of the input image refers to a portion of the input image that is to be drawn over the projection surface by sweeping the light beam according to the scanning pattern. Moreover, since the scanning pattern is substantially in the form of the spiral, the first region of the input image is substantially circular in shape. Furthermore, the centre of the spiral substantially corresponds to a centre of the first region. In operation, the processor controls the at least one light source to emit the light beam therefrom. The light beam is swept over the projection surface for drawing at least the first region over the projection surface. Notably, the at least one beam scanning arrangement is controlled to change (namely, adjust) the direction in which the light beam is to be incident upon the projection surface for sweeping the light beam. Therefore, the light beam is swept according to the scanning pattern for drawing at least the first region according to the scanning pattern. The light beam is swept in form of the spiral to draw at least the first region. When the first region is drawn over the projection surface, a projection of the first region of the input image is directed towards the user's eyes.

While drawing at least the first region of the input image, the light beam need not necessarily entirely fill a region of the projection surface upon which the first region of the input image is to be drawn. In other words, there may exist some gaps (or un-scanned portions) within such a region of the projection surface when the light beam is swept to draw the first region. However, it will be appreciated that the light beam is beam is swept in a manner that the gaps (if any) are imperceptible to the user, thereby making the first region of the input image appear continuous to the user. Optionally, the distance between successive turnings of the spiral and a number of turnings of the spiral are adjustable to provide minimal gaps within the region of the projection surface upon which the first region of the input image is to be drawn.

By "at least the first region of the input image" it is meant that in some implementations, only the first region of the input image is drawn and in other implementations, at least one other region of the input image is drawn in addition to the first region of the input image. In such implementations, when the first region and the at least one other region collectively constitute an entirety of the input image, the entire image is drawn over the projection surface by way of the at least one light source, the at least one beam scanning arrangement, and the processor. Optionally, a resolution of the at least one other region of the input image is different from the resolution of the first region of the input image. Furthermore, the resolution of the at least one other region of the input image can be a constant resolution or a variable resolution. When the at least one other region is drawn over the projection surface, a projection of the at least one other region is directed towards the user's eyes.

The resolution of the first region of the input image is to vary as the function of an angular distance from the centre of the spiral. Throughout the present disclosure, the term "angular distance" between two points, as viewed from a viewpoint different from either of these points, generally refers to an angle between two directions originating from the viewpoint and directed toward these two points. The phrase "angular distance from the centre of the spiral" refers to an angular distance between a given point on the spiral and the centre of the spiral as seen from the user's eyes, when the display apparatus, in operation, is worn by the user.

In an example implementation, when the spiral is a logarithmic spiral, each point on the spiral is at a unique angular distance from the centre of the spiral since turnings of the logarithmic spiral spread progressively. In another example implementation, when the spiral comprises the plurality of concentric circles, all points lying on a same circle are at a same angular distance from the centre of the spiral. Furthermore, in such an implementation, points lying on different circles are at different angular distances from the centre of the spiral.

Throughout the present disclosure, the term "resolution" is to be understood to refer to angular resolution (namely, a number of pixels per degree, also referred to as points per degree (PPD)). Notably, an increase in the resolution corresponds to an increase in the number of pixels per degree, and a decrease in an angular pixel size. Furthermore, the term "resolution" also refers to pixel density (namely, a number of pixels per unit area). Notably, an increase in resolution corresponds to an increase in the number of pixels per unit area.

Optionally, the resolution of the first region of the input image varies inversely with the angular distance from the centre of the spiral. In other words, the resolution of the first region of the input image decreases with an increase in the angular distance from the centre of the spiral, and vice versa. Such a variation in the resolution of the first region with respect to the angular distance from the centre of the spiral can be linear, non-linear (for example, such as exponential), step-wise (namely, abruptly), or any combination thereof. In such a case, the resolution of the first region substantially mimics resolution properties of the human visual system (namely, the user's eyes). Notably, such a variation in the resolution of the first region is substantially similar to a resolution curve of the human visual system. The resolution curve of the human visual system represents an inverse variation in resolution of a human's eye with respect to visual angle (in degrees) from the fovea of the human's eye. One such exemplary resolution curve has been illustrated in conjunction with FIG. 5.

In an example, the resolution of the first region may vary linearly with respect to the angular distance from the centre of the spiral. In such a case, the resolution of the first region would decrease linearly and uniformly on going from the centre of the spiral towards a peripheral turning of the spiral.

In another example, the resolution of the first region may vary exponentially with respect to the angular distance from the centre of the spiral. In such a case, the resolution of the first region would decrease non-linearly and exponentially on going from the centre of the spiral towards a peripheral turning of the spiral.

In another example, the resolution of the first region may vary step-wise with respect to the angular distance from the centre of the spiral. In such a case, the resolution of the first region would decrease in discontinuous steps on going from the centre of the spiral towards a peripheral turning of the spiral. For example, for a given spiral having 500 turnings, a resolution of all points lying on 0-100 turnings from the centre of the spiral may have resolution R, a resolution of all points lying on 101-200 turnings from the centre of the spiral may have resolution 0.9*R, a resolution of all points lying on 201-300 turnings from the centre of the spiral may have resolution 0.8*R, a resolution of all points lying on 301-400 turnings from the centre of the spiral may have resolution 0.7*R, and a resolution of all points lying on 401-500 turnings from the centre of the spiral may have resolution 0.6*R.

Optionally, the display apparatus further comprises at least one beam modulation arrangement, the at least one beam modulation arrangement being configured to modulate at least one of: an intensity of the light beam, a wavelength of the light beam, a width of the light beam. Throughout the present disclosure, the term "beam modulation arrangement" refers to specialized hardware, software, firmware, or a combination of these, that is configured to modulate at least one property of the light beam. The beam modulation arrangement can modulate the light beam in a direct manner (for example, via controlling a drive signal of the at least one light source) and/or in an indirect manner (for example, via optical modulation devices arranged on an optical path of the light beam). It will be appreciated that in some implementations, the at least one beam modulation arrangement is coupled to the processor and in other implementations, the at least one beam modulation arrangement is implemented by way of the processor. In other words, the processor is configured to control operation of the at least one beam modulation arrangement.

Optionally, the at least one beam modulation arrangement is implemented by way of at least one of: a lens (for example, such as a Liquid Crystal lens, a collimating lens, and the like), a mechanical shutter, a collimating mirror, a colour filter, a polarizer, a light absorbing element (for example, such as a light absorbing screen, a light absorbing film, and the like), the processor.

Optionally, the intensity and/or the width of the light beam are to be modulated according to a variation in the resolution. Notably, with the variation in the resolution of the first region of the input image, the angular pixel size that is to be drawn by the light beam also varies. As a result, the width of the light beam is to be modulated in a manner that the width of the light beam increases with an increase in the angular pixel size, and vice versa. The width of the light beam may change linearly, non-linearly, or in a step-wise manner with respect to the variation in the resolution. In an example, when the resolution of the first region of the input image varies inversely as a function of the angular distance from the centre of the spiral, an angular pixel size in a peripheral portion of the first region would be greater than an angular pixel size in a central portion of the first region. Therefore, the width of the light beam is to be modulated in a manner that the width of the light beam required for sweeping the peripheral portion of the first region would be greater than the width of the light beam required for sweeping the central portion of the first region. Furthermore, the intensity of the light beam is to be modulated in a manner that the intensity of the light beam increases with an increase in the angular pixel size, and vice versa. The intensity of the light beam may change linearly, non-linearly, or in a step-wise manner with respect to the variation in the resolution. In an example, the intensity of the light beam required for drawing a pixel having a large angular pixel size would be higher than the intensity of the light beam required for drawing a pixel having a small angular pixel size. Such a manner of modulating the intensity of the light beam allows for illuminating pixels of the first region in a manner that intensity per unit area for each pixel is substantially constant. As a result, all the pixels of the first region appear to have uniform brightness, irrespective of their angular pixel size.

In an example, the at least one beam modulation arrangement may be implemented by way of two light absorbing screens for modulating the intensity of the light beam. In such an example, when the light beam is to have a low intensity, both the light absorbing screens may be employed to significantly reduce the intensity of the light beam. Moreover, when the light beam is to have a moderate intensity, only one of the two light absorbing screens may be employed to moderately reduce the intensity of the light beam. Furthermore, when the light beam is to have a high intensity, none of the two light absorbing screens may be employed to provide the high intensity of the light beam.

In another example, the at least one beam modulation arrangement may be implemented at least in part by way of the processor, wherein the processor may control the drive signal of the at least one light source to modulate the intensity of the light beam. For example, a higher voltage of the drive signal may be provided to the at least one light source for increasing an intensity of the light beam, and vice versa.

In yet another example, the at least one beam modulation arrangement may be implemented by way of the processor and at least one Liquid Crystal lens arranged on an optical path of the light beam. In such an example, the Liquid Crystal lens may be electrically controllable by the processor to adjust the width of the light beam. Notably, the at least one Liquid Crystal lens could be provided with different levels of electric charge to control molecular alignment of liquid crystal molecules, thereby controlling the width of the light beam.

Optionally, the wavelength of the light beam is to be modulated according to colour information of the first region of the input image. Notably, whilst drawing a given pixel of the first region over the projection surface, the light beam is to have a wavelength that corresponds to a required colour of the given pixel. As an example, if the first region of the input image is to have both red-coloured pixels and green-coloured pixels, the light beam would be modulated to have a wavelength approximately equal to 700 nanometers whilst drawing the red-coloured pixels and a wavelength approximately equal to 550 nanometers whilst drawing the green-coloured pixels.

In an example, the at least one beam modulation arrangement may be implemented by way of at least one colour filter arranged on the optical path of the light beam. In such a case, the at least one colour filter would restrict light rays having undesired wavelengths (if any) in the light beam from being incident upon the projection surface. As a result, only a monochromatic light beam including light rays of a desired wavelength is incident upon the projection surface.

Optionally, the at least one light source and the at least one beam modulation arrangement are implemented as an integrated unit. Alternatively, optionally, the at least one light source and the at least one beam modulation arrangement are implemented as separate units within the display apparatus.

Optionally, the display apparatus further comprises at least one display that, in operation, renders a second region of the input image at a resolution that is lower than the resolution of the first region. The at least one display is coupled to the processor. The "second region" of the input image refers to a remaining portion of the input image, wherein the second region is different from the first region. Notably, since the resolution of the second region is lower than the resolution of the first region, the first region can be understood to be a "focus region" or a "high-resolution region" of the input image whereas the second region can be understood to be a "context region" or a "low-resolution region" of the input image. Optionally, the resolution of the second region is substantially equal to, or lower than a minimum resolution of the first region. It will be appreciated that the first region and the second region are separate regions of a same input image depicting the visual scene, wherein the first region and second region collectively constitute the entirety of the input image. Therefore, the second region could also be understood to be a remaining region of the input image, which is different from the first region of the input image. When the first region is drawn over the projection surface and the second region is displayed at the at least one display, the projection of the first region of the input image and a projection of the second region of the input image are directed towards the user's eyes. The different resolutions of the first region and the second region of the input image allow for the rendered input image to emulate foveation characteristics of the human visual system. Notably, the different resolutions emulate a manner in which the user's eyes would perceive visual detail of the input image if the projection of the first region of the input image is incident upon the fovea of the user's eyes and the projection of the second region of the input image is incident upon the retina of the user's eyes. Hereinabove, the term "projection of a given portion of the input image" refers to a collection of light rays emanating from the projection surface and/or the at least one display when the given portion of the input image is rendered thereat. The projection of the given portion of the input image (namely, the collection of light rays) may transmit through and/or reflect from various optical elements of the display apparatus before reaching the user's eye. For purposes of embodiments of the present disclosure, the term "projection of the given portion of the input image" has been used consistently, irrespective of whether the collection of light rays is transmitted or reflected.

Optionally, the at least one display is selected from the group consisting of: a Liquid Crystal Display (LCD), a Light Emitting Diode (LED)-based display, an Organic LED (OLED)-based display, a micro OLED-based display, a Liquid Crystal on Silicon (LCoS)-based display, and a Cathode Ray Tube-based display.

Optionally, the processor is configured to perform at least one edge processing operation to smoothen a boundary between the first region of the input image and the second region of the input image. The at least one edge processing operation minimizes perceived distortion on a boundary between the first region of the input image and the second region, when the optically projections of the first and second regions of the input image are incident upon the user's eyes. The at least one edge processing operation could include a filtering operation, a pixel intermixing operation, and the like. It will be appreciated that the at least one edge processing operation allows for implementing a smooth blending effect along the boundary of the first region and the second region. As a result, a change in resolution from the relatively higher resolution of the first region to the relatively lower resolution of the second region appears as a gradual gradation to the user.

Optionally, the at least one display is a multi-layered structure, the projection surface being implemented by way of at least one layer of the multi-layered structure. Optionally, in such an instance, the at least one layer used for implementing the projection surface is mechanically bonded and/or electrically coupled to other layers of the multi-layered structure of the at least one display. Furthermore, the at least one layer used for implementing the projection surface has specific transmittance and reflectance specifications that facilitate drawing of at least the first region of the input image thereupon. Such specific transmittance and reflectance specifications optionally depend on a side (namely, a front side or a back side) from which the light beam for drawing at least the first region is to be incident upon the multi-layered structure.

Optionally, the multi-layered structure of the at least one display comprises layers of at least one of: colour filters, encapsulation glass, backplanes built on substrates (such as glass, polyimide, and so forth), protection films, top and/or bottom polarizers. Optionally, in this regard, characteristics (or properties) of such layers are adjustable and facilitate better drawing of the first region of the input image on the at least one projection surface of the at least one display.

Optionally, the at least one display is arranged to substantially surround the projection surface. Such an arrangement of the at least one display with respect to the projection surface allows for the second region (displayed on the at least one display) to appear to surround the first region (drawn on the projection surface), when the projections of the first and second regions are incident upon the user's eyes. It will be appreciated that such an embodiment encompasses all possible arrangements of the at least one display and the projection surface that allow for the second region to apparently surround the first region. Some of these possible arrangements are described in detail hereinbelow.

In an embodiment, the at least one display and the projection surface are arranged to lie in one plane, the at least one display being physically arranged to surround the projection surface. As a result, the first region and the second region are rendered in a non-overlapping manner at a substantially similar optical distance from the user's eyes, the second region substantially surrounding the first region.

In another embodiment, the at least one display is arranged behind the projection surface, when viewed from a perspective of the user's eyes. In such an example, dimensions of the at least one display may be larger than dimensions of the projection surface, so as to allow the second region of the input image to apparently surround the first region of the input image. Furthermore, a separation between the projection surface and the at least one display is to be selected such that the first portion and the second portion appear continuous to the user. Optionally, the second region of the input image is displayed on a portion of the at least one display that is unobstructed (namely, uncovered) by the projection surface, from the perspective of the user's eyes. Alternatively, optionally, the entirety of the input image is displayed on the at least one display in a manner that the second region is displayed on a portion of the at least one display that is unobstructed (namely, uncovered) by the projection surface whereas the first region is displayed on a remaining portion of the at least one display that is obstructed (namely, covered) by the projection surface. In such a case, the processor is optionally configured to mask (namely, hide or obscure) the first region that is displayed on the remaining portion of the at least one display, wherein such masking relates to modifying content of such a first region (for example, by way of dimming or darkening its corresponding pixels) in a manner that such a first region is not visible to the user. Such a masking operation prevents optical distortion of the first region, when the projection of the first region is optically combined with the projection of the second region. Furthermore, the masking is optionally performed in a manner that transitional area seams (or edges) between the first region and the second region are reduced, for example minimized.

Optionally, the display apparatus comprises at least one optical combiner to be employed to optically combine the projection of the first region of the input image with the projection of the second region of the input image. Herein, the term "optical combiner" refers to equipment (for example, such as optical elements) for optically combining the projections of the first and second regions of the input image. In operation, the at least one optical combiner optically combines the projections of the first and second regions of the input image to constitute a combined projection, wherein the combined projection is a projection of the input image depicting the visual scene. It will be appreciated that the first region and the second region are rendered substantially simultaneously in order to avoid time lag during optical combination of projections thereof. Optionally, the steps of rendering the first region and the second region and optically combining their projections occur substantially simultaneously, and are repeated for subsequent sets of first and second regions corresponding to each input image of the sequence of images corresponding to the visual scene.

Optionally, the at least one optical combiner allows for optically combining the projections of the first and second regions of the input image in a manner that the projection of the second region substantially surrounds the projection of the first region. In such a case, the at least one display and the projection surface can be arranged with respect to each other in any manner.

Optionally, the at least one optical combiner is implemented by way of at least one of: a lens, a mirror, a semi-transparent mirror, a semi-transparent film, a semi-transparent flexible membrane, a prism, a beam splitter, an optical waveguide, a polarizer.

Optionally, the display apparatus further comprises:
means for detecting a gaze direction of a user, wherein the gaze direction is to be detected when the display apparatus in operation is worn by the user; and
at least one beam steering arrangement per eye,
wherein the processor is configured to:
determine, based upon the detected gaze direction, the first region of the input image as a region of interest to the user;
determine, based upon the detected gaze direction, a region of the projection surface upon which the first region of the input image is to be drawn; and
control the at least one beam steering arrangement to focus the light beam on said region of the projection surface. In such a case, said means and the at least one beam steering arrangement are coupled to the processor. The term "region of interest" refers to a region of the input image whereat the gaze direction of the user is directed (namely, focused) when the user views the input image. In other words, the region of interest is a fixation region within the input image. Specifically, the region of interest is projected onto the fovea of the user's eyes, and is resolved to a much greater detail as compared to the remaining region(s) of the input image, when the input image is viewed by the user. Notably, in such a case, the first region is to correspond to the region of interest at which the user's gaze is focused while viewing the input image. Therefore, the projection of the first region of the input image is to be incident upon the fovea of the user's eyes, for allowing the user to view the first region with high visual acuity. However, the first region of the input image changes according to a change in the gaze direction of the user (namely, due to a movement of the user's eyes). Therefore, the region of the projection surface upon which the first region of the input image is to be drawn would also change according to the change in the first region. At a given time, the first region is determined as a current region of interest of the user, based upon a current gaze direction of the user. Therefore, a current location of the region of the projection surface upon which the first region of the input image is to be drawn within the projection surface may substantially correspond to a location of the current region of interest within the input image. The at least one beam steering arrangement is controlled to focus the light beam on said region of the projection surface, according to the gaze direction of the user. Such a manner of steering the light beam to dynamically control a location of focusing the light beam upon the projection surface allows for the implementing active foveation within the display apparatus. Notably, once the light beam is focused on said region of the projection surface, the first region is drawn over the projection surface as described hereinabove.

Throughout the present disclosure, the term "means for detecting gaze direction" refers to specialized equipment for detecting the gaze direction of the user, when the user views the input image. The display apparatus uses the means for detecting gaze direction for determining aforesaid gaze direction via non-invasive techniques when the display apparatus is worn by the user. Beneficially, an accurate detection of the gaze direction facilitates the display apparatus to closely implement gaze contingency thereon. Examples of the means for detecting the gaze direction include contact lenses with motion sensors, cameras monitoring position of pupil of the user's eyes, and the like. Such means for tracking the gaze direction are well known in the art.

Throughout the present disclosure, the term "beam steering arrangement" refers to equipment (for example, such as optical elements, electromechanical components, and so forth) that is controllable to adjust a location of focusing the light beam upon the projection surface. The at least one beam steering arrangement is controllable to steer the light beam across the projection surface, based upon the gaze direction of the user. Notably, the processor is configured to control orientation and/or movement of the at least one beam steering arrangement to focus the light beam onto said region of the projection surface upon which the first region of the input image is to be drawn. As a result, the first region is drawn on the projection surface in an optically aligned manner according to the gaze direction of the user, for enabling implementation of active foveation within the display apparatus.

Optionally, the at least one beam steering arrangement comprises at least one steering actuator for moving at least one of: the at least one light source with respect to the projection surface, the projection surface, the at least one beam scanning arrangement with respect to the projection surface, at least one optical element positioned on the optical path between the at least one light source and the projection surface. Notably, the at least one steering actuator implements the aforesaid movement operation according to the change in the gaze direction of the user, so as to allow the light beam to be focused upon a required region of the projection surface for drawing the first region. Optionally, the movement implemented by way of the at least one steering actuator includes at least one of: displacement (horizontally and/or vertically), rotation and/or tilting of at least one of the aforesaid components. In operation, the at least one steering actuator employs an actuation signal (for example, such as an electric current, hydraulic pressure, pneumatic pressure, and the like) for providing the aforesaid movement.

Optionally, the at least one beam steering arrangement comprises the at least one optical element positioned on the optical path between the at least one light source and the projection surface. Therefore, the light beam is directed towards the at least one optical element, wherefrom the light beam is directed towards the projection surface. In such a case, the at least one optical element allows for adjusting the optical path of the light beam, thereby, facilitating steering the light beam to control the location of focusing the light beam upon the projection surface. Optionally, the at least one optical element is implemented by way of at least one of: a lens, a prism, a mirror, a beam splitter, an optical waveguide.

Optionally, said means comprises a configuration of gaze sensors, wherein the processor is configured to:

process sensor data collected by the configuration of gaze sensors to determine a current gaze location and a current gaze velocity and/or acceleration of the user;

predict a gaze location and a gaze velocity and/or acceleration of the user, based at least partially upon the current gaze location and the current gaze velocity and/or acceleration; and determine, based upon the predicted gaze direction and the predicted gaze velocity and/or acceleration, a next region of the projection surface upon which a first region of a next input image is to be drawn. Throughout the present disclosure, the term "gaze location" refers to a position of a point or a region within the visual scene whereat the user's gaze is directed, the term "gaze velocity" refers to a rate of change (namely, shifting) of the user's gaze, and the term "gaze acceleration" refers to a rate of change of the gaze velocity of the user. The current gaze location, the current gaze velocity and/or acceleration, the predicted gaze location and the predicted gaze velocity and/or acceleration of the user are beneficially utilized for implementing active foveation whilst presenting a given sequence of images (of a give visual scene) to the user via the display apparatus. The current gaze location and the current gaze velocity and/or acceleration of the user are processed to determine a first region of a current input image as a current region of interest of the user, and to determine a current region of the projection surface upon which the first region of the current input image is to be drawn. As a result, at a current time, the at least one beam steering arrangement is controlled to focus the light beam on said current region of the projection surface. Furthermore, the predicted gaze location and the predicted gaze velocity and/or acceleration of the user are processed to determine a first region of the next input image as a next region of interest of the user, and to determine the next region of the projection surface upon which the first region of the next input image is to be drawn. It will be appreciated that knowledge of said next region of the projection surface allows for controlling operations of various components (for example, such as the at least one beam steering arrangement) of the display apparatus in a manner that the user enjoys an uninterrupted viewing experience. Specifically, operative adjustments of such various components may be carried out time-efficiently in a manner that minimal time would be required for such components to adjust when the change in the user's gaze actually occurs. As a result, when the user's gaze actually shifts from the current gaze location to the predicted gaze location, the light beam can be quickly steered to focus on the next region of the projection surface with minimal time-lag, for drawing the first region of the next input image.

Throughout the present disclosure, the term "configuration of gaze sensors" refers to a group of specialized sensor equipment that allows for detecting and/or monitoring the user's gaze. In operation, the configuration of gaze sensors collects sensor data pertaining to the user's gaze by way of monitoring the gaze direction of the user and optionally, also monitoring movement and/or orientation of the user's head (which, in turn, moves the user's eyes). Therefore, the configuration of gaze sensors acts as the means for detecting the gaze direction of the user and optionally, also as a means for tracking a head movement and/or a head orientation of the user. It will be appreciated that the detected gaze direction of the user and the orientation of user's head user may or may not be similar. When the sensor data collected by the configuration of gaze sensors is processed, the current gaze location of the user is determined by using the detected gaze direction of the user to identify the position of the point or the region within the visual scene whereat the user's gaze is directed. Furthermore, the current gaze velocity and/or acceleration is/are determined by processing sensor data pertaining to the detected gaze direction of the user and sensor data pertaining to the movement and/or orientation of the user's head. It will be appreciated that the gaze velocity and/or acceleration can be determined in instances when there is movement of the user's head, as well as when the user's head is still. In an instance, when there is the user's head moves, the current gaze velocity and/or acceleration may be determined by processing the sensor data pertaining to the detected gaze direction of the user's eyes and the sensor data pertaining to the movement and/or orientation of the user's head. In another instance, when the user's head is still, the current gaze velocity and/or acceleration may be determined by processing the sensor data pertaining to the determined gaze direction and the determined movement of the user's eyes. It will be appreciated that optionally, gaze sensors of the aforesaid configuration are to be employed for both eyes of the user on a shared-basis. Alternatively, optionally, separate gaze sensors of the aforesaid configuration are to be employed for separate eyes of the user.

Optionally, a given gaze sensor is implemented by way of at least one illuminator for emitting light to illuminate the user's eyes when the display apparatus is worn by the user on his/her head, and at least one image sensor for capturing at least one image of reflections of the light from the user's eyes. In such a case, sensor data collected by the given gaze sensor relates to the at least one image of the user's eyes, as captured by the at least one image sensor.

Optionally, a given gaze sensor is implemented by way of at least one accelerometer. In such a case, sensor data collected by the at least one accelerometer allows for determining gaze velocity and/or acceleration of the user by tracking movement of the user's head.

Optionally, a given gaze sensor is implemented by way of at least one gyroscope. In such a case, sensor data collected by the at least one accelerometer allows for determining the gaze velocity and/or acceleration of the user by tracking orientation of the user's head.

Optionally, the processor is configured to predict the gaze location and the gaze velocity and/or acceleration of the user, based also upon information pertaining to the visual scene being presented to the user. Notably, the visual scene being presented to the user depicts various objects and/or features which generally have specific characteristics associated therewith. Examples of such characteristics include, but are not limited to, visual characteristics, material composition, audio characteristics, haptic characteristics, and physical interaction characteristics. The processor utilizes knowledge pertaining to the aforesaid characteristics of objects and/or features within the visual scene to predict how the user's eyes would react whilst viewing the visual scene. As an example, for a given visual scene that corresponds to a given sequence of images, the processor can predict the gaze location and the gaze velocity of the user, based upon visual characteristics of objects depicted in the given sequence of images. In such a case, if a given image of the sequence depicts a small-sized object in a central portion thereof, and its subsequent image depicts a large-sized object in a right portion thereof, the processor can utilise such information pertaining to the visual scene, to predict that the gaze location of the user would shift rightwards with a given gaze velocity.

Optionally, the information pertaining to the visual scene comprises information indicative of a location of an object present in the visual scene that has at least one of: an audio feature of interest, a visual feature of interest, a physical interaction with another object present in the visual scene. Notably, if the object has audio features of interest, visual features of interest, physical interactions with other objects, and so forth, there exists a high likelihood that the user's gaze would be directed towards such an object since such characteristics generally attract the user's attention. Therefore, knowledge of the location of such a noticeable (namely, eye-catching) object facilitates the processor in making intelligent and accurate predictions of the gaze location and the gaze velocity and/or acceleration of the user. Notably, the term "object" encompasses both virtual objects as well as actual real-world objects in the real-world environment whereat the user is physically present. Notably, the virtual objects could be digitally simulated objects (namely, virtual reality objects) and/or virtual depictions of real-world objects present in a given real-world environment (namely, mixed reality objects). Such depictions of the real-world objects are obtained, for example, by way of images of the given real-world environment that can be obtained via a video see-through arrangement (such as imaging devices mounted on an outer surface of the display apparatus). Furthermore, the actual real-world objects (in the real-world environment of the user) can be directly shown to the user via an optical see-through arrangement (such as a semi-transparent lens).

Optionally, the processor is configured to generate pixel data corresponding to at least the first region of the input image, and to control the at least one light source and the at least one beam scanning arrangement according to such pixel data for drawing at least the first region of the input image over the projection surface. In such a case, the light beam is to be swept within a given region of the projection surface according to the pixel data corresponding to at least the first region of the input image, whilst drawing at least the first region. The term "pixel data" refers to information pertaining to a single pixel or a set of pixels within an entire pixel array associated with a given region of the input image. For example, the pixel data may include information such as, but not limited to, angular pixel size of pixels of the given region, shape of pixels of the given region, colors of the pixels of the given region, intensity associated with the pixels of the given region, positions of the pixels of the given region, arrangement of the pixels of the given region, and total number of the pixels of the given region.

Optionally, the processor is configured to generate the pixel data corresponding to the first region of the input image based upon at least one of: the resolution of the first region of the input image, visual information pertaining to the first region of the input image, a shape of the light beam. In an example, pixel data pertaining to all pixels within the first region may describe variation in angular pixels sizes as a function of angular distance from the centre of the spiral since the resolution of the first region varies as the function of angular distance from the centre of the spiral. In such a case, the angular pixel size increases with a decrease in resolution, and vice versa. In another example, pixel data pertaining to a set of pixels within the first region may describe the colour of the set of pixels to be blue since the visual information pertaining to the first region may describe such a set of pixels to depict a water body within the input image. In yet another example, pixel data pertaining to a pixel of the first region of the input may describe the shape of the pixel to be substantially circular since the shape of the light beam is substantially circular (namely, the cross section of the light beam is substantially circular).

Optionally, the processor is configured to perform at least one of: shape correction, colour distortion correction, on the pixel data of the first region of the input image.

Optionally, the pixel data of the first region of the input image is to be stored in at least one of:
  a set of two-dimensional buffers, the set of two-dimensional buffers comprising different buffers that store pixel data corresponding to different resolutions,
  a spiral ray buffer, wherein the spiral ray buffer is to be derived from the set of two-dimensional buffers,
  a just-in-time spiral ray buffer, wherein the just-in-time spiral ray buffer is to be derived from the set of two-dimensional buffers based upon a gaze direction of a user. It will be appreciated that the processor employs ring buffers, straight memory handle pass, or other similar techniques for processing or transferring the pixel data of the first region of the input image is stored in at least one of the aforesaid buffers. Throughout the present disclosure, the term "buffer" refers to portion of a memory that is used to control the at least one light source and the at least one beam scanning arrangement for drawing at least the first region of the input image over the projection surface. Optionally, a given buffer stores pixel data of a given visual scene as a sequence of frames corresponding to a sequence of images constituting the given visual scene, wherein each frame comprises pixel data of a corresponding input image.

Optionally, when the pixel data of the first region of the input image is stored in the set of two-dimensional buffers, the processor is configured to select a given two-dimensional buffer for drawing a given portion of the first region of the input image when a resolution at which pixel data is stored in the given buffer is substantially similar to a required resolution of the given portion of the first region of the input image. In such a case, the processor would select different buffers for drawing different portions of the first region since the resolution of the first region is variable. Notably, each buffer of the set of two-dimensional buffers stores pixel data of an entirety of the first region at a distinct resolution, and therefore, a requisite buffer can be selected according to the aforesaid selection criteria for drawing a corresponding portion of the first region. A "portion" of the first region could include a single pixel or a set of pixels. It will be appreciated that storing the pixel data of the first region of the input image in the set of two-dimensional buffers allows for the processor to fetch pixel data from a selected buffer with minimal time lag upon requirement, thereby, improving an overall latency of the display apparatus.

As an example, the pixel data of the first region may be stored in a set of four two-dimensional buffers B1, B2 B3 and B4 wherein the buffer B1 stores pixel data of the entirety of the first region at a resolution Z, the buffer B2 stores pixel data of the entirety of the first region at a resolution 0.75*Z, the buffer B3 stores pixel data of the entirety of the first region at a resolution 0.5*Z, and the buffer B4 stores pixel data of the entirety of the first region at a resolution 0.25*Z.

Given that the resolution of the first region decreases exponentially as a function of the angular distance from the centre of the spiral, pixels of the first region can be divided into three portions P1, P2 and P3 wherein pixels of the portion P1 are substantially at the centre of the first region, pixels of the portion P3 are substantially at a periphery of the first region, and pixels of the portion P2 are between the pixels of the portions P1 and P3. In such an example, the processor may select the buffer B1 for drawing the portion P1 of the first region, the buffer B2 for drawing the portion P2 of the first region, and the buffer B4 for drawing the portion P3 of the first region.

Optionally, the spiral ray buffer is implemented as a single buffer that stores pixel data of different portions of the first region of the input image at different resolutions. In other words, the spiral ray buffer stores the pixel data of the entirety of the first region at a variable resolution, wherein such variable resolution substantially corresponds to the resolution of the first region.

Optionally, to derive the spiral ray buffer from the set of two-dimensional buffers, the processor is configured to:
  select a plurality of two-dimensional buffers from the set for drawing the first region, wherein a selected two-dimensional buffer is to be employed for drawing a corresponding portion of the first region;
  obtaining pixel data from the plurality of two-dimensional buffers, wherein pixel data to be obtained from a given two-dimensional buffer includes only pixel data corresponding to the portion of the first region that is to be drawn using the given two-dimensional buffer; and
  combining the obtained pixel data to create a variable pixel data of the entirety of the first region, the variable pixel data comprising pixel data of different portions of the first region of the input image at different resolutions, wherein the variable pixel data is to be stored in the spiral ray buffer. Optionally, in the variable pixel data, the pixel data of different portions of the first region is arranged in a spiral formatted manner (namely, in an order of consecutive portions of the first region according to the spiral).

As an example, a spiral ray buffer S may be derived from the set of four two-dimensional buffers B1, B2 B3 and B4 by: selecting the buffers B1, B2 and B4 for drawing the portions P1, P2 and P3 of the first region, respectively; obtaining pixel data of the portions P1, P2 and P3 of the first region from the buffers B1, B2 and B4, respectively; and combining the obtained pixel data to create a variable pixel data of the entirety of the first region, the variable pixel data comprising the pixel data of the portion P1 at resolution Z, the pixel data of the portion P2 at resolution 0.75*Z and the pixel data of the portion P3 at resolution 0.25*Z. Such a variable pixel data is stored in the spiral ray buffer S in a spiral formatted manner such that the pixel data of the portion P1 is followed by the pixel data of the portion P2, which is further followed by the pixel data of the portion P3.

Optionally, the just-in-time spiral ray buffer is implemented as a single buffer that stores pixel data of different portions of the first region of the input image at different resolutions, based upon the gaze direction of the user. Similar to the spiral ray buffer, the just-in-time spiral ray buffer stores the pixel data of the entirety of the first region at the variable resolution. However, in the just-in-time spiral ray buffer, the first region for which the pixel data is to be stored at the variable resolution is determined according to the gaze direction of the user. Since the first region of the input image would vary according to the gaze direction of the user, the pixel data stored in the just-in-time spiral ray buffer would be continuously updated according to the gaze direction of the user. It will be appreciated that to derive the just-in-time spiral ray buffer from the set of two-dimensional buffers, the processor is configured to determine, based upon the detected gaze direction, the first region of the input image as a region of interest to the user, and thereafter, perform the aforementioned steps of deriving the spiral ray buffer from the set of two-dimensional buffers. Furthermore, optionally, in the just-in-time spiral ray buffer, the pixel data of different portions of the first region is arranged in the spiral formatted manner. The just-in-time spiral ray buffer eliminates a need for having multiple, full buffers to draw the first region, and can therefore be populated with pixel data in real time or near-real time according to the gaze direction of the user.

It will be appreciated that the set of two-dimensional buffers and the spiral ray buffer can be utilized for drawing the first region at a fixed region of the projection surface (for example, at a central region of the projection surface). Typically, users are known to have a tendency of gazing towards a fixed portion (for example, such as a central portion) of a given visual scene. In such a case, when the user wishes to view another portion (for example, such as a peripheral portion) of the given visual scene, he/she typically orients his/her head in a manner that the given visual scene changes to a next visual scene. Therefore, when the gaze direction of the user is substantially towards the fixed portion of the visual scene, a location of the region of the projection surface upon which the first region of the input image is to be drawn is substantially constant. As a result, such buffers can be efficiently populated with pixel data of the first region and be used for drawing the first region at said region of the projection surface, without requiring information of the gaze direction of the user. It will also be appreciated that the just-in-time spiral ray buffer can be utilized for drawing the first region according to the gaze direction of the user. In such a case, a location of the region of the projection surface upon which the first region of the input image is to be drawn varies with change in the gaze direction of the user.

Optionally, the display apparatus further comprises an exit optical element. The exit optical element (commonly referred to as an "eyepiece") refers to an optical element that is configured to direct the projection of at least the first region of the input image towards the user's eyes, when the display apparatus in operation is worn by the user. The exit optical element is arranged between the projection surface and the user's eyes. Furthermore, optionally, the exit optical element is configured to alter an optical path and/or optical characteristics of at least the projection of the first region. In one example, the exit optical element may magnify a size (or angular dimensions) of the projections of the first region and the second region of the input image. In such a case, use of a magnifying exit optical element allows for using a dimensionally small projection surface and a dimensionally small display(s) within the display apparatus.

Optionally, the exit optical element is implemented by way of at least one of: a convex lens, a plano-convex lens, a Liquid Crystal (LC) lens, a liquid lens, a Fresnel lens, a spherical lens, a chromatic lens.

The present disclosure also relates to the method as described above. Various embodiments and variants disclosed above apply mutatis mutandis to the method.

Optionally, in the method, the display apparatus further comprises the at least one beam modulation arrangement, the method comprising modulating, via the at least one beam modulation arrangement, at least one of: the intensity of the light beam, the wavelength of the light beam, the width of the light beam.

Optionally, in the method, the intensity and/or the width of the light beam are modulated according to the variation in the resolution.

Optionally, in the method, the spiral is the logarithmic spiral.

Optionally, in the method, the spiral comprises the plurality of concentric circles, and wherein the light beam is swept along the circumference of the given circle before moving onto another circle adjacent to the given circle.

Optionally, in the method, the display apparatus further comprises the at least one display, the method comprising rendering, via the at least one display, the second region of the input image at the resolution that is lower than the resolution of the first region.

Optionally, in the method, the display apparatus further comprises the means for detecting the gaze direction of the user and the at least one beam steering arrangement per eye, the method comprising:
  determining, based upon the detected gaze direction, the first region of the input image as the region of interest to the user;
  determining, based upon the detected gaze direction, the region of the projection surface upon which the first region of the input image is to be drawn; and
  controlling the at least one beam steering arrangement to focus the light beam on said region of the projection surface.

Optionally, in the method, said means comprises the configuration of gaze sensors, the method comprising:
  processing the sensor data collected by the configuration of gaze sensors to determine the current gaze location and the current gaze velocity and/or acceleration of the user;
  predicting the gaze location and the gaze velocity and/or acceleration of the user, based at least partially upon the current gaze location and the current gaze velocity and/or acceleration; and
  determining, based upon the predicted gaze direction and the predicted gaze velocity and/or acceleration, the next region of the projection surface upon which a first region of the next input image is to be drawn.

Optionally, the method further comprises storing the pixel data of the first region of the input image in at least one of:
  the set of two-dimensional buffers, the set of two-dimensional buffers comprising different buffers that store the pixel data corresponding to different resolutions,
  the spiral ray buffer, wherein the spiral ray buffer is derived from the set of two-dimensional buffers,
  the just-in-time spiral ray buffer, wherein the just-in-time spiral ray buffer is derived from the set of two-dimensional buffers based upon the gaze direction of the user.

DETAILED DESCRIPTION OF THE DRAWINGS

Referring to FIG. 1, illustrated is a block diagram of architecture of a display apparatus 100, in accordance with an embodiment of the present disclosure. As shown, the display apparatus 100 comprises at least one light source per eye, depicted as a light source 102 for a left eye of a user and a light source 104 for a right eye of the user; at least one beam scanning arrangement per eye, depicted as a beam scanning arrangement 106 for the left eye of the user and a beam scanning arrangement 108 for the right eye of the user; and a processor 110.

It may be understood by a person skilled in the art that the FIG. 1 includes a simplified architecture of the display apparatus 100 for sake of clarity, which should not unduly limit the scope of the claims herein. The person skilled in the art will recognize many variations, alternatives, and modifications of embodiments of the present disclosure.

Figure 2:
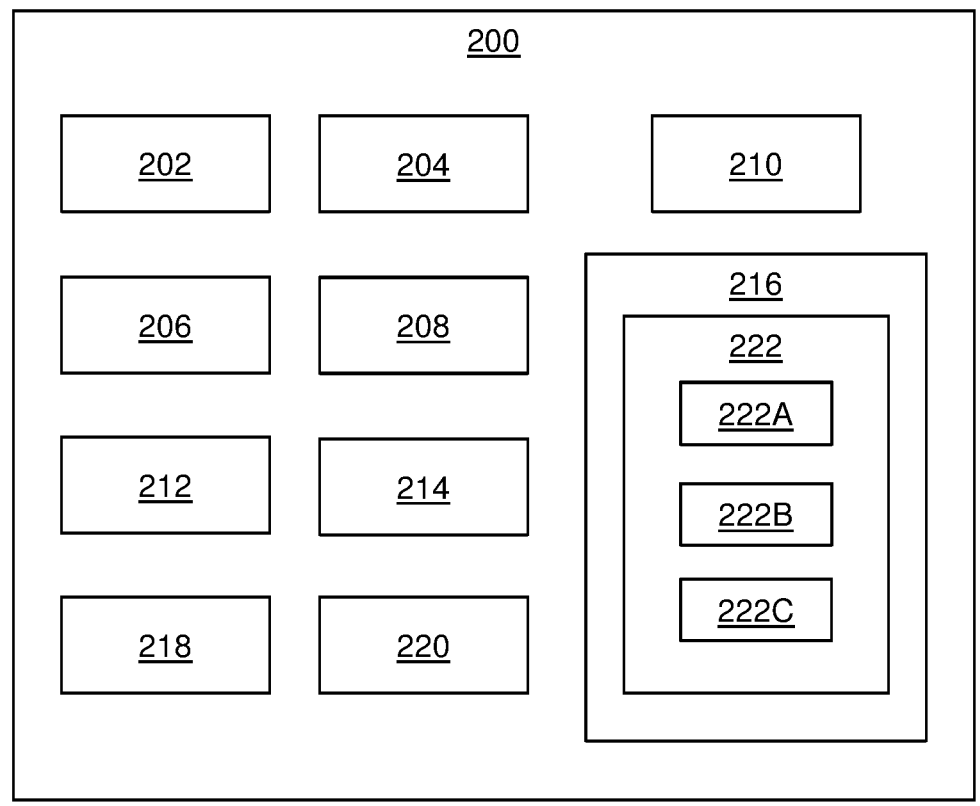
FIG. 2 illustrates a block diagram of architecture of a display apparatus, in accordance with another embodiment of the present disclosure.

Referring to FIG. 2, illustrated is a block diagram of architecture of a display apparatus 200, in accordance with another embodiment of the present disclosure. As shown, the display apparatus 200 comprises at least one light source per eye, depicted as a light source 202 for a left eye of a user and a light source 204 for a right eye of the user; at least one beam scanning arrangement per eye, depicted as a beam scanning arrangement 206 for the left eye of the user and a beam scanning arrangement 208 for the right eye of the user; and a processor 210. The display apparatus 200 further comprises at least one beam modulation arrangement, depicted as a beam modulation arrangement 212; at least one display, depicted as a display 214; means 216 for detecting a gaze direction of the user; and at least one beam steering arrangement per eye, depicted as depicted as a beam steering arrangement 218 for the left eye of the user and a beam steering arrangement 220 for the right eye of the user. Furthermore, the means 216 for detecting the gaze direction of the user comprises a configuration of gaze sensors 222. As shown, the configuration of gaze sensors 222 comprises gaze sensors, depicted, for example, as a set 222A of an illuminator and an image sensor, a gyroscope 222B and an accelerometer 222C.

It may be understood by a person skilled in the art that the FIG. 2 is merely an example, which should not unduly limit the scope of the claims herein. The person skilled in the art will recognize many variations, alternatives, and modifications of embodiments of the present disclosure. In an example, the display apparatus 200 may comprise the light sources 202 and 204; the beam scanning arrangements 206 and 208; the processor 210 and the beam modulation arrangement 212. In another example, the display apparatus 200 may comprise the light sources 202 and 204; the beam scanning arrangements 206 and 208; the processor 210; the beam modulation arrangement 212; and the display 214.

Figure 3:
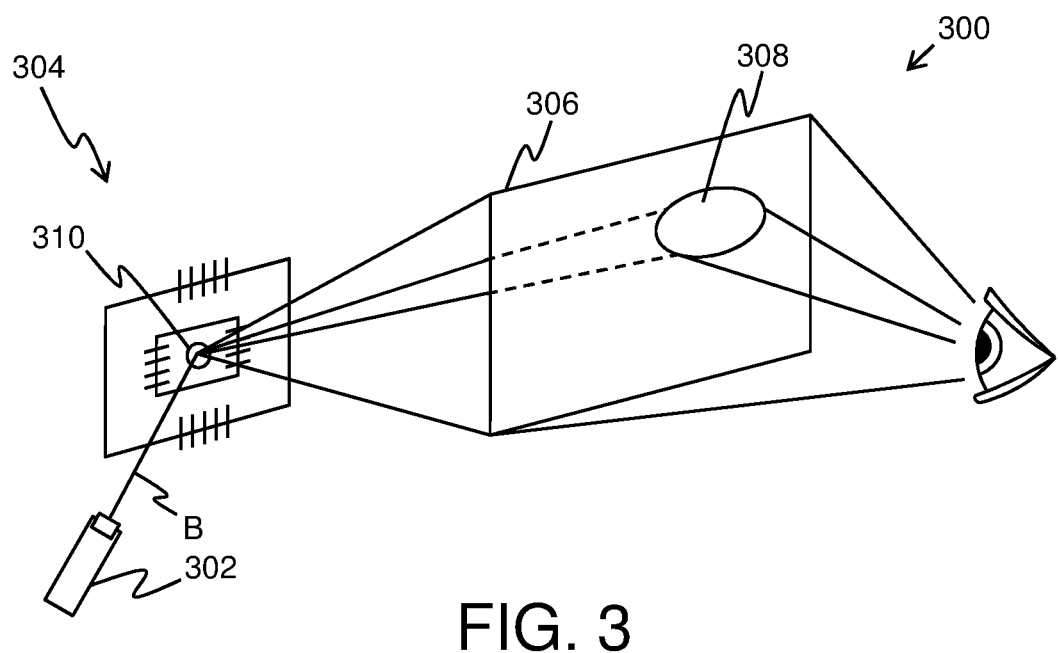
FIG. 3 illustrates an exemplary implementation of a display apparatus, in accordance with an embodiment of the present disclosure.

Referring to FIG. 3, illustrated is an exemplary implementation of a display apparatus 300, in accordance with an embodiment of the present disclosure. As shown, the display apparatus 300 comprises at least one light source per eye, depicted as a light source 302, at least one beam scanning arrangement per eye, depicted as a beam scanning arrangement 304 and a processor (not shown). The light source 302 is operable to emit a light beam B. The beam scanning arrangement 304 is configured to direct the light beam B towards a projection surface 306 and to sweep the light beam B according to a scanning pattern, the scanning pattern being substantially in a form of a spiral. The processor is configured to control the light source 302 and the beam scanning arrangement 304 to draw at least a first region 308 of an input image over the projection surface 306, wherein a resolution of the first region 308 of the input image is to vary as a function of an angular distance from a centre of the spiral. As shown, the beam scanning arrangement 304 is implemented by way of a controllable scanning mirror 310 arranged to reflect the light beam B towards the projection surface 306.

It may be understood by a person skilled in the art that the FIG. 3 is merely an example, which should not unduly limit the scope of the claims herein. The person skilled in the art will recognize many variations, alternatives, and modifications of embodiments of the present disclosure. For example, the display apparatus 300 generally includes an exit optical element arranged between the projection surface 306 and the user's eye. However, the exit optical element is not shown, for sake of simplifying the illustration.

Figure 4:
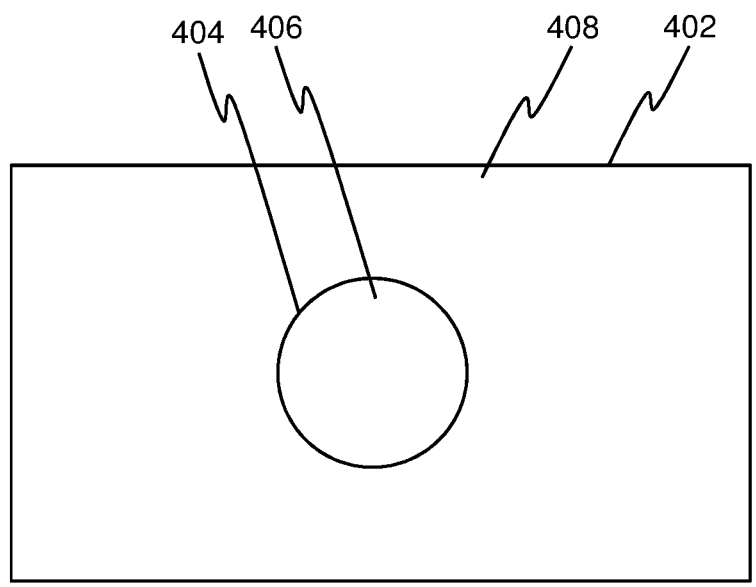
FIG. 4 illustrates an exemplary arrangement of a display and a projection surface of a display apparatus, in accordance with an embodiment of the present disclosure.

Referring to FIG. 4, illustrated is an exemplary arrangement of a display 402 and a projection surface 404 of a display apparatus, in accordance with an embodiment of the present disclosure. As shown, the display 402 is arranged to substantially surround the projection surface 404. In operation, a first region 406 of an input image is drawn over the projection surface 404, wherein a resolution of the first region 406 of the input image is to vary as a function of an angular distance from a centre of a spiral. Furthermore, the display 402 in operation, renders a second region 408 of the input image at a resolution that is lower than the resolution of the first region 406.

It may be understood by a person skilled in the art that the FIG. 4 is merely an example, which should not unduly limit the scope of the claims herein. The person skilled in the art will recognize many variations, alternatives, and modifications of embodiments of the present disclosure.

Figure 5:
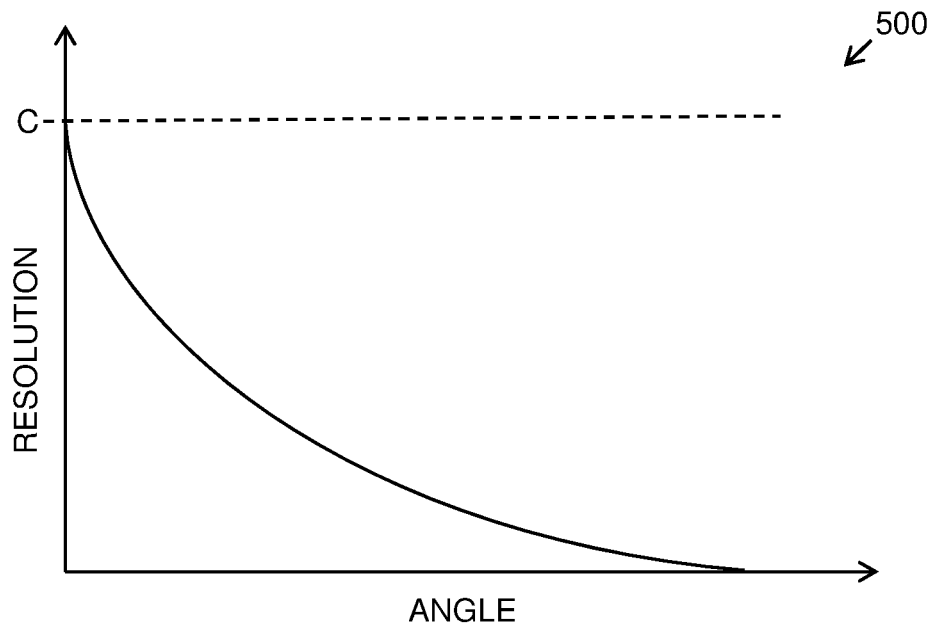
FIG. 5 illustrates a resolution curve of a human visual system, in accordance with an embodiment of the present disclosure.

Referring to FIG. 5, illustrated is a resolution curve 500 of a human visual system (namely, a user's eyes), in accordance with an embodiment of the present disclosure. As shown, an X-axis (namely, a horizontal axis) of the resolution curve 500 represents a visual angle (in degrees) from fovea of the user's eyes and a Y-axis (namely, a vertical axis) of the resolution curve 500 represents a resolution of the user's eyes. Notably, the resolution curve 500 represents an inverse variation in the resolution of the user's eyes with respect to visual angle from the fovea of the user's eyes. Moreover, a point C represents a maximum resolution of the user's eyes, which occurs at the fovea of the user's eyes.

Figure 6:
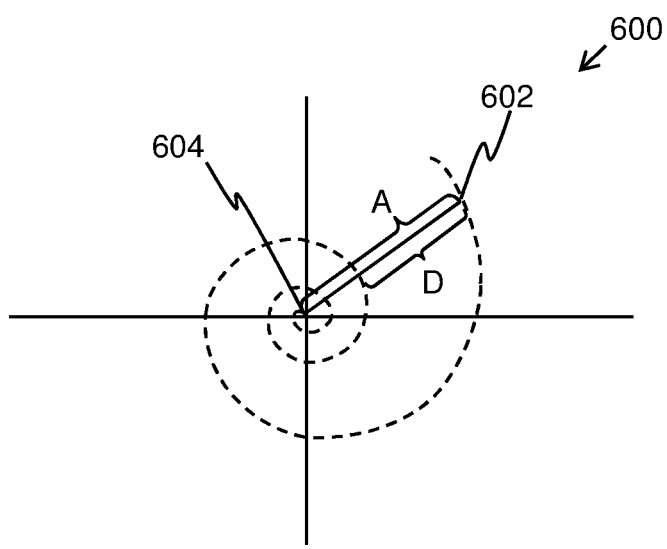
FIG. 6 illustrates a schematic illustration of a spiral, in accordance with an embodiment of the present disclosure.

Referring to FIG. 6, illustrated is a schematic illustration of a spiral 600, in accordance with an embodiment of the present disclosure. As shown, the spiral 600 opens up according to the resolution curve 500 of the human visual system of FIG. 5. The spiral 600 is a form of a scanning pattern that is to be used for sweeping a light beam over a projection surface. Furthermore, A represents that there exists an angular distance between a given point 602 on the spiral 600 and a center 604 of the spiral 600 as seen from the user's eyes, when a display apparatus, in operation, is worn by the user. Notably, a solid line joining the given point 602 and the center 604 of the spiral 600 does not represent an actual linear distance between the given point 602 and the center 604 of the spiral 600, but is only drawn to represent the angular distance A between the given point 602 and the center 604 of the spiral 600, in an exemplary manner. Moreover, D represents a distance between successive turnings of the spiral 600. As shown, the spiral 600 is a logarithmic spiral. In such a case, each point on the spiral 600 is at a unique angular distance from the centre of the spiral 600 since turnings of the logarithmic spiral spread progressively. Furthermore, the distance D between the successive turnings of the spiral 600 varies as a geometric progression.

Figure 7:
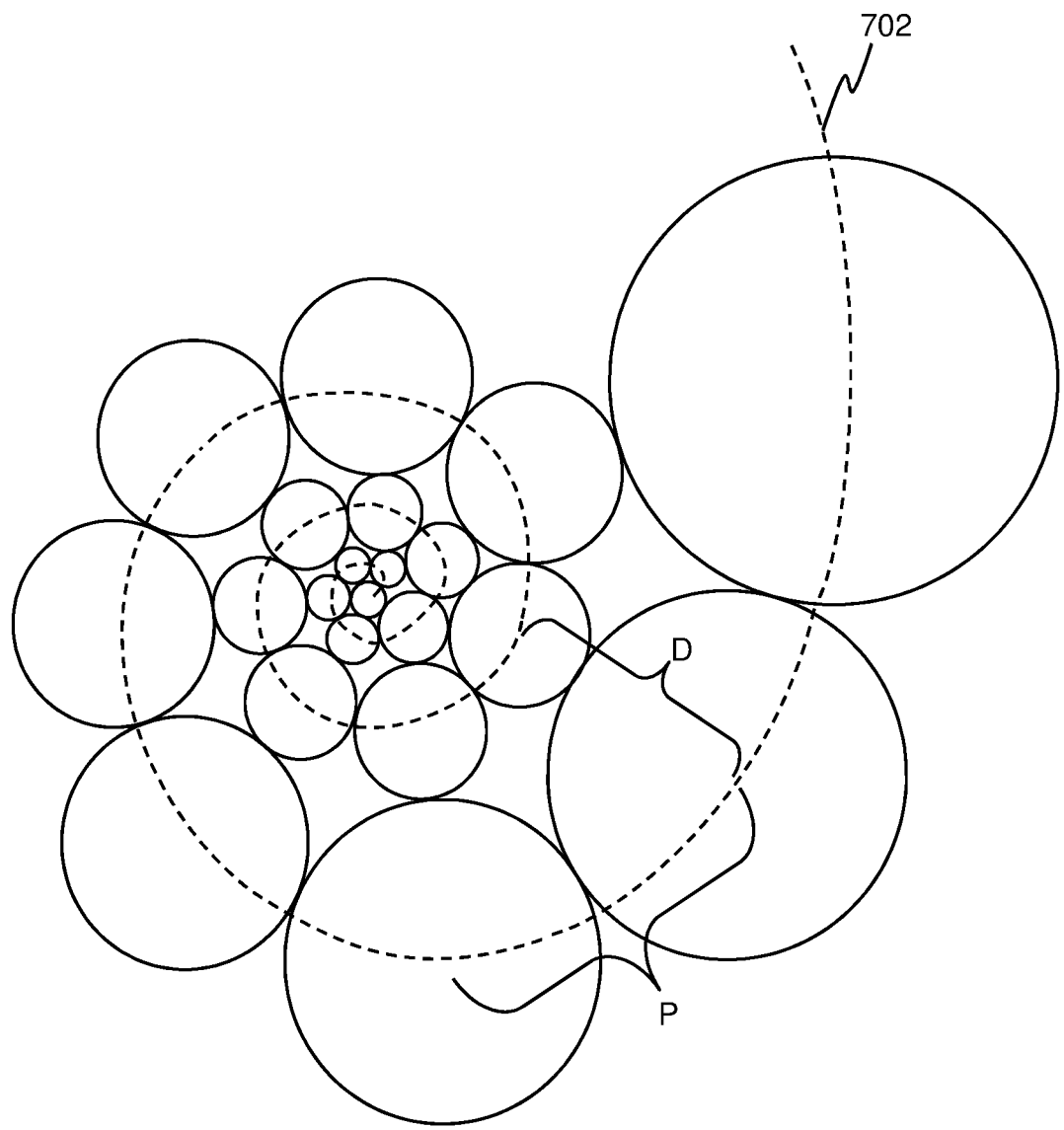
FIG. 7 illustrates a schematic illustration of a light beam sweeping over a projection surface according to a scanning pattern, in accordance with an embodiment of the present disclosure.

Referring to FIG. 7, illustrated is a schematic illustration of a light beam sweeping over a projection surface according to a scanning pattern 702, in accordance with an embodiment of the present disclosure. As shown, the scanning pattern 702 is substantially in a form of a spiral. The light beam is swept according to the scanning pattern 702 for drawing a first region of an input image. As shown, circular-shaped pixels of the first region of the input image are drawn by the light beam, wherein a resolution of the first region of the input image is to vary as a function of an angular distance from a centre of the spiral. Notably, D represents a distance between successive turnings of the spiral. Moreover, P represents distance between centres of two adjacent pixels. As shown, an angular pixel size of each pixel is different from all other pixels since the illustrated spiral is a logarithmic spiral, and therefore, each pixel on the spiral is at a unique angular distance from the centre of the spiral. Larger the angular pixel size of a given pixel, lower is the resolution, and vice versa.

It may be understood by a person skilled in the art that the FIG. 7 is merely an example, which should not unduly limit the scope of the claims herein. The person skilled in the art will recognize many variations, alternatives, and modifications of embodiments of the present disclosure.

Figure 8:
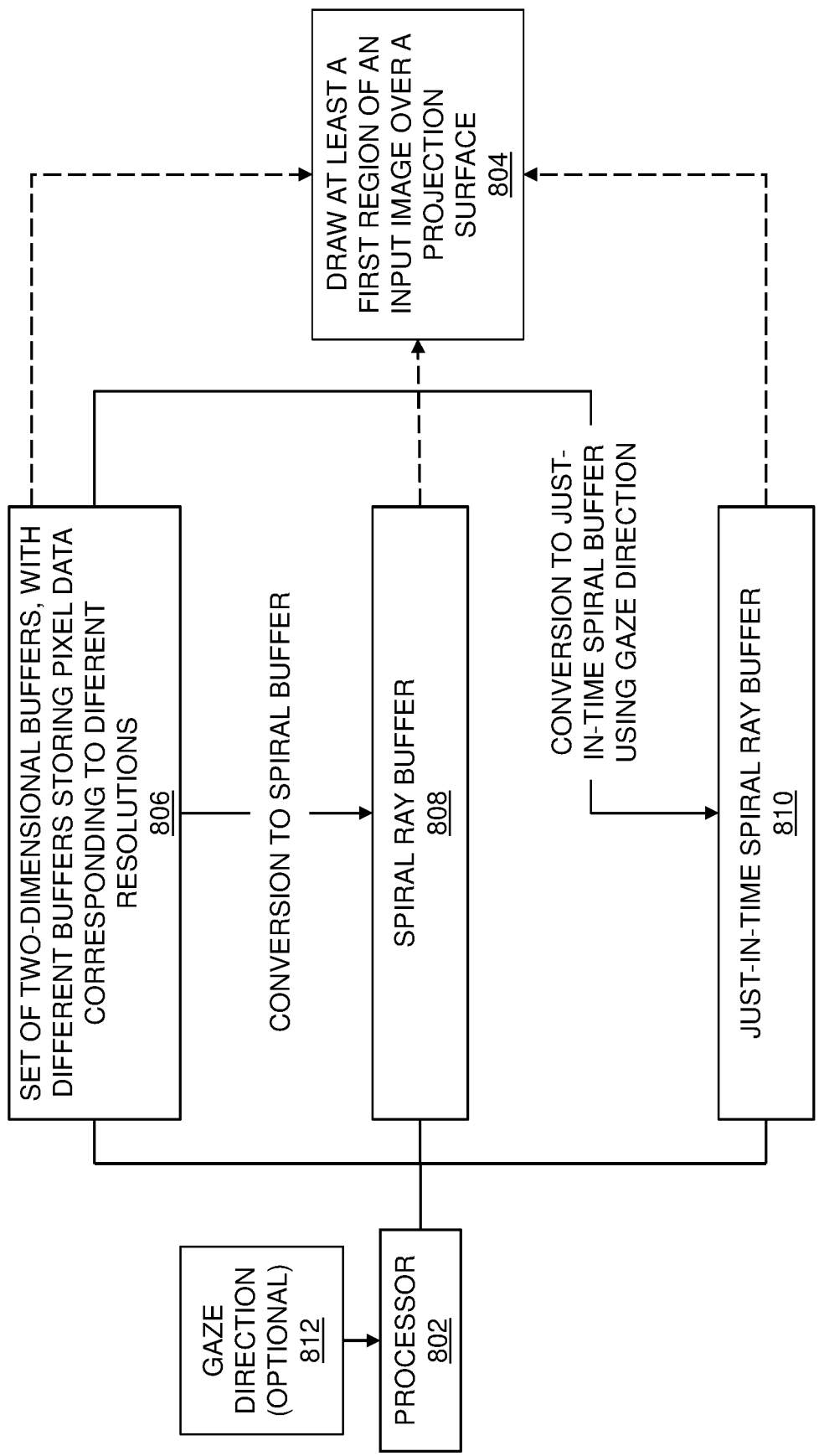
FIG. 8 illustrates an exemplary processing flow within a display apparatus, in accordance with an embodiment of the present disclosure.

Referring to FIG. 8, illustrated is an exemplary processing flow within a display apparatus, in accordance with an embodiment of the present disclosure. Such a processing flow relates to managing pixel data of a first region of an input image at a processor 802, wherein such pixel data is to be used for drawing at least the first region of the input image at a projection surface (depicted as processing step 804). Notably, pixel data of the first region of the input image is stored in at least one of: a set 806 of two-dimensional buffers, a spiral ray buffer 808, a just-in-time spiral ray buffer 810. The set 806 of two-dimensional buffers comprises different buffers that store pixel data corresponding to different resolutions. In such a case, the processor 802 is configured to select a given two-dimensional buffer from the set 806 of two-dimensional buffers for drawing a given portion of the first region of the input image over the projection surface. The spiral ray buffer 808 can be derived from the set 806 of two-dimensional buffers. In such a case, the spiral ray buffer 808 is implemented as a single buffer that stores pixel data of different portions of the first region of the input image at different resolutions. The just-in-time spiral ray buffer 810 can be derived from the set 806 of two-dimensional buffers based upon a gaze direction 812 of the user. In such a case, the just-in-time 810 spiral ray buffer is implemented as a single buffer that stores pixel data of different portions of the first region of the input image at different resolutions, based upon a gaze direction 812 of the user. For deriving the just-in-time spiral ray buffer 810, the display apparatus utilizes a means for detecting the gaze direction of the user, wherein the gaze direction 812 is detected when the display apparatus in operation is worn by the user.

Figure 9:
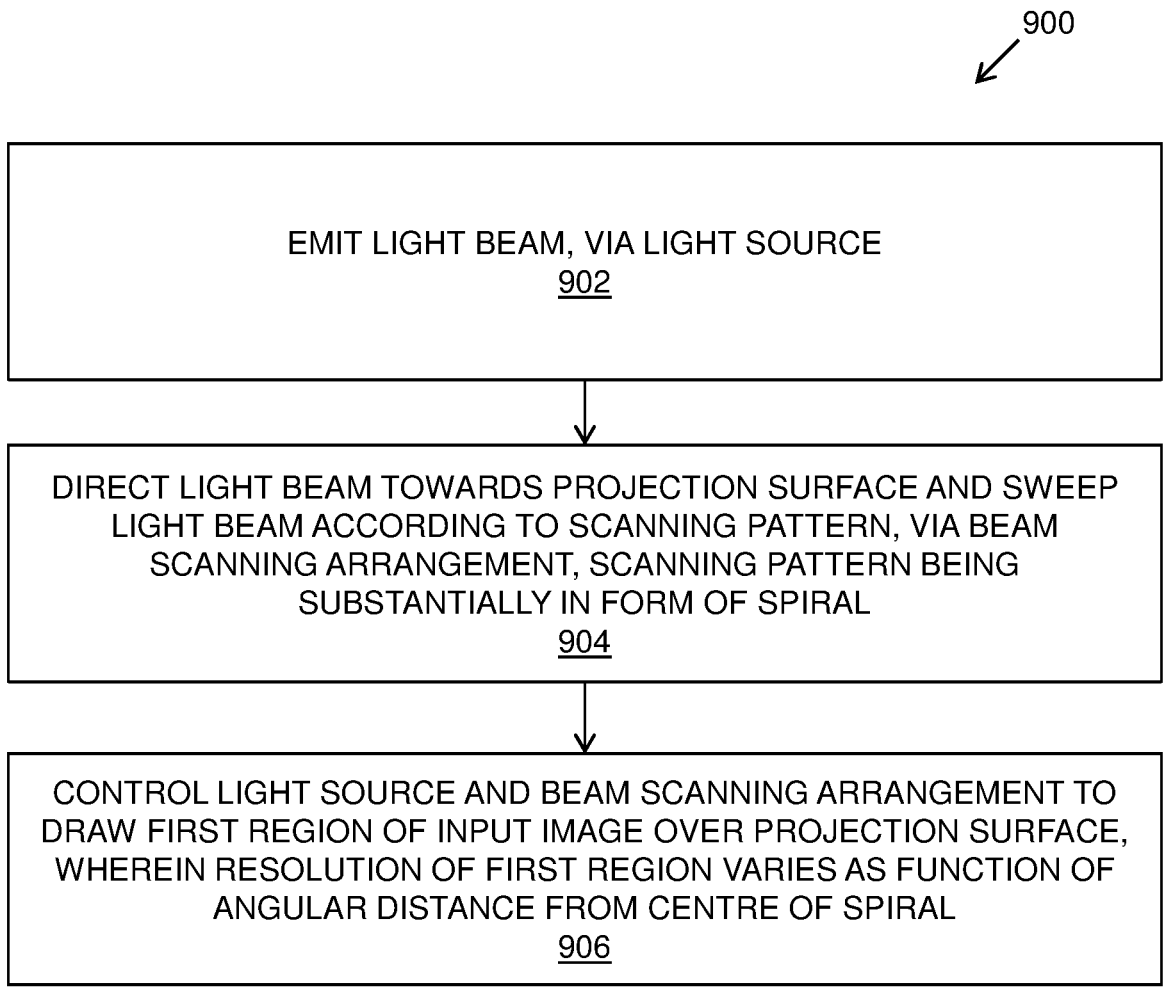
FIG. 9 illustrates steps of a method of displaying, via a display apparatus, in accordance with an embodiment of the present disclosure.

Referring to FIG. 9, illustrated are steps of a method 900 of displaying, via a display apparatus, in accordance with an embodiment of the present disclosure. In the method 900, the display apparatus comprises at least one light source per eye and at least one beam scanning arrangement per eye. At step 902, a light beam is emitted via the at least one light source. At step 904, the light beam is directed towards a projection surface and the light beam is swept according to a scanning pattern, via the at least one beam scanning arrangement, the scanning pattern being substantially in a form of a spiral. At step 906, the at least one light source and the at least one beam scanning arrangement are controlled to draw at least a first region of an input image over the projection surface, wherein a resolution of the first region of the input image varies as a function of an angular distance from a centre of the spiral.

The steps 902 to 906 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:
    at least one light source per eye, the at least one light source being operable to emit a light beam;
    at least one beam scanning arrangement per eye, the at least one beam scanning arrangement being configured to direct the light beam towards a projection surface, and to sweep the light beam according to a scanning pattern, the scanning pattern being substantially in a form of a spiral of pixels; and
    a processor configured to control the at least one light source and the at least one beam scanning arrangement to draw at least a first region of an input image over the projection surface,
    wherein a resolution of the first region of the input image and a distance between centers of adjacent pixels along the spiral vary as a function of an angular distance from a center of the spiral,
    and wherein a width of the light beam is modulated according to the variation in resolution.

2. The display apparatus of claim 1, further comprising at least one beam modulation arrangement, the at least one beam modulation arrangement being configured to modulate at least one of: an intensity of the light beam, a wavelength of the light beam.

3. The display apparatus of claim 2, wherein the intensity of the light beam is to be modulated according to a variation in the resolution.

4. The display apparatus of claim 1, wherein the spiral is a logarithmic spiral.

5. The display apparatus of claim 1, wherein the spiral comprises a plurality of concentric circles, and wherein the light beam is to be swept along a circumference of a given circle before moving onto another circle adjacent to the given circle.

6. The display apparatus of claim 1, wherein the at least one beam scanning arrangement is implemented by way of at least one of:
    a controllable scanning mirror arranged to reflect the light beam towards the projection surface,
    at least one actuator that, in operation, changes an orientation of the at least one light source to direct the light beam towards the projection surface.

7. The display apparatus of claim 1, further comprising at least one display that, in operation, renders a second region of the input image at a resolution that is lower than the resolution of the first region.

8. The display apparatus of claim 7, wherein the at least one display is a multi-layered structure, the projection surface being implemented by way of at least one layer of the multi-layered structure.

9. The display apparatus of claim 7, wherein the at least one display is arranged to substantially surround the projection surface.

10. The display apparatus of claim 1, further comprising:
    means for detecting a gaze direction of a user, wherein the gaze direction is to be detected when the display apparatus in operation is worn by the user; and
    at least one beam steering arrangement per eye,
    wherein the processor is configured to:
        determine, based upon the detected gaze direction, the first region of the input image as a region of interest to the user;
        determine, based upon the detected gaze direction, a region of the projection surface upon which the first region of the input image is to be drawn; and
        control the at least one beam steering arrangement to focus the light beam on said region of the projection surface.

11. The display apparatus of claim 10, wherein said means comprises a configuration of gaze sensors, wherein the processor is configured to:
    process sensor data collected by the configuration of gaze sensors to determine a current gaze location and a current gaze velocity and/or acceleration of the user;
    predict a gaze location and a gaze velocity and/or acceleration of the user, based at least partially upon the current gaze location and the current gaze velocity and/or acceleration; and
    determine, based upon the predicted gaze direction and the predicted gaze velocity and/or acceleration, a next region of the projection surface upon which a first region of a next input image is to be drawn.

12. The display apparatus of claim 1, wherein pixel data of the first region of the input image is to be stored in at least one of:
    a set of two-dimensional buffers, the set of two-dimensional buffers comprising different buffers that store pixel data corresponding to different resolutions,
    a spiral ray buffer, wherein the spiral ray buffer is to be derived from the set of two-dimensional buffers,
    a just-in-time spiral ray buffer, wherein the just-in-time spiral ray buffer is to be derived from the set of two-dimensional buffers based upon a gaze direction of a user.

13. A method of displaying, via a display apparatus comprising at least one light source per eye and at least one beam scanning arrangement per eye, the method comprising:
    emitting a light beam, via the at least one light source;
    directing the light beam towards a projection surface and sweeping the light beam according to a scanning pattern, via the at least one beam scanning arrangement, the scanning pattern being substantially in a form of a spiral of pixels; and
    controlling the at least one light source and the at least one beam scanning arrangement to draw at least a first region of an input image over the projection surface,
    wherein a resolution of the first region of the input image and a distance between centers of adjacent pixels along the spiral vary as a function of an angular distance from a center of the spiral,
    and wherein a width of the light beam is modulated according to the variation in resolution.

14. The method of claim 13, wherein the display apparatus further comprises at least one beam modulation arrangement, the method comprising modulating, via the at least one beam modulation arrangement, at least one of: an intensity of the light beam, a wavelength of the light beam.

15. The method of claim 14, wherein the intensity of the light beam is modulated according to a variation in the resolution.

16. The method of claim 13, wherein the spiral is a logarithmic spiral.

17. The method of claim 13, wherein the spiral comprises a plurality of concentric circles, and wherein the light beam is swept along a circumference of a given circle before moving onto another circle adjacent to the given circle.

18. The method of claim 13, wherein the display apparatus further comprises at least one display, the method comprising rendering, via the at least one display, a second region of the input image at a resolution that is lower than the resolution of the first region.

19. The method of claim 13, wherein the display apparatus further comprises means for detecting a gaze direction of a user and at least one beam steering arrangement per eye, the method comprising:
- determining, based upon the detected gaze direction, the first region of the input image as a region of interest to the user;
- determining, based upon the detected gaze direction, a region of the projection surface upon which the first region of the input image is to be drawn; and
- controlling the at least one beam steering arrangement to focus the light beam on said region of the projection surface.

20. The method of claim 19, wherein said means comprises a configuration of gaze sensors, the method comprising:
- processing sensor data collected by the configuration of gaze sensors to determine a current gaze location and a current gaze velocity and/or acceleration of the user;
- predicting a gaze location and a gaze velocity and/or acceleration of the user, based at least partially upon the current gaze location and the current gaze velocity and/or acceleration; and
- determining, based upon the predicted gaze direction and the predicted gaze velocity and/or acceleration, a next region of the projection surface upon which a first region of a next input image is to be drawn.

21. The method of claim 13, the method comprising storing pixel data of the first region of the input image in at least one of:
- a set of two-dimensional buffers, the set of two-dimensional buffers comprising different buffers that store pixel data corresponding to different resolutions,
- a spiral ray buffer, wherein the spiral ray buffer is derived from the set of two-dimensional buffers,
- a just-in-time spiral ray buffer, wherein the just-in-time spiral ray buffer is derived from the set of two-dimensional buffers based upon a gaze direction of a user.

* * * * *